(12) United States Patent
Abraham et al.

(10) Patent No.: US 7,875,099 B2
(45) Date of Patent: Jan. 25, 2011

(54) AIR FILTRATION IN COMPUTER SYSTEMS

(75) Inventors: Benjamin Abraham, Cupertino, CA (US); Yancy Chen, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 619 days.

(21) Appl. No.: 11/888,293

(22) Filed: Jul. 31, 2007

(65) Prior Publication Data

US 2009/0031896 A1 Feb. 5, 2009

(51) Int. Cl.
*B01D 46/00* (2006.01)
(52) U.S. Cl. .................. 95/4; 95/14; 95/17; 95/57; 95/273; 96/19; 96/63; 96/407; 96/417; 96/420; 55/385.6; 55/467
(58) Field of Classification Search ............ 55/385.6, 55/471, 473, DIG. 34, DIG. 39, 467; 96/25, 96/18, 63, 397, 424, 420, 417, 407, 19; 95/2, 95/4, 14, 17, 57, 273; 323/903; 361/226, 361/233; 700/273
See application file for complete search history.

(56) References Cited

U.S. PATENT DOCUMENTS

| | | | | |
|---|---|---|---|---|
| 2,784,675 A | * | 3/1957 | Farrell | 285/321 |
| 3,989,486 A | * | 11/1976 | Baysinger | 96/19 |
| 4,790,862 A | * | 12/1988 | Naruo et al. | 96/397 |
| 5,287,244 A | | 2/1994 | Hileman et al. | |
| 5,428,964 A | * | 7/1995 | Lobdell | 62/176.6 |
| 5,660,605 A | * | 8/1997 | Chan et al. | 96/19 |
| 5,688,308 A | * | 11/1997 | Voigts | 96/18 |
| 5,751,549 A | | 5/1998 | Eberhardt et al. | |
| 5,772,732 A | * | 6/1998 | James et al. | 95/25 |
| 5,914,453 A | * | 6/1999 | James et al. | 95/14 |
| 5,942,017 A | * | 8/1999 | Van Winkle, Sr. | 55/385.1 |
| 5,963,424 A | | 10/1999 | Hileman et al. | |
| 6,093,229 A | * | 7/2000 | Lee et al. | 55/385.2 |
| 6,113,485 A | | 9/2000 | Marquis et al. | |
| 6,540,812 B2 | * | 4/2003 | Farmer et al. | 95/2 |
| 6,616,736 B2 | * | 9/2003 | Massey et al. | 96/25 |
| 6,620,222 B2 | * | 9/2003 | White | 95/273 |
| 6,660,070 B2 | * | 12/2003 | Chung et al. | 96/424 |
| 6,800,106 B2 | * | 10/2004 | Cogar et al. | 55/385.6 |
| 7,199,542 B1 | * | 4/2007 | Chen | 318/473 |
| 7,261,762 B2 | * | 8/2007 | Kang et al. | 95/1 |
| 7,445,665 B2 | * | 11/2008 | Hsieh et al. | 96/417 |
| 7,459,002 B2 | * | 12/2008 | Kalous et al. | 55/385.1 |
| 7,488,375 B1 | * | 2/2009 | Chen | 96/25 |
| 7,686,872 B2 | * | 3/2010 | Kang | 96/417 |
| 7,794,529 B2 | * | 9/2010 | Lo | 96/420 |
| 2008/0245235 A1 | * | 10/2008 | Brioschi | 96/420 |

OTHER PUBLICATIONS

International Search Report dated Feb. 6, 2009 for International Application No. PCT/US2008/008269 filing date Jul. 3, 2008.

* cited by examiner

*Primary Examiner*—Duane Smith
*Assistant Examiner*—Minh-Chau Pham

(57) ABSTRACT

An electronic device includes a housing defining a chamber, a circuit board positioned in the chamber and having at least one integrated circuit, an air inlet port and an air outlet port formed in the housing, a fluid flow generator to generate an air flow across the circuit board in the chamber, and an electrostatic air filtration system to filter air entering the chamber from the air inlet port.

20 Claims, 4 Drawing Sheets

AIR FILTRATION IN COMPUTER SYSTEMS

TECHNICAL FIELD

This application relates to electronic computing, and more particularly air filtration in computer systems.

BACKGROUND

Computing system components generate heat which may need to be dissipated to maintain the computer system in operable condition. Many computer systems utilize fans to generate an airflow through the computer housing in order to dissipate heat generated by the components. Airflow through the computer housing can permit dirt and dust particles to enter the housing, which can interfere with cooling operations of the computer system.

DETAILED DESCRIPTION

Described herein are exemplary system and methods for implementing an air filtration system in an electronic device such as, e.g., a computing system. Some of the methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
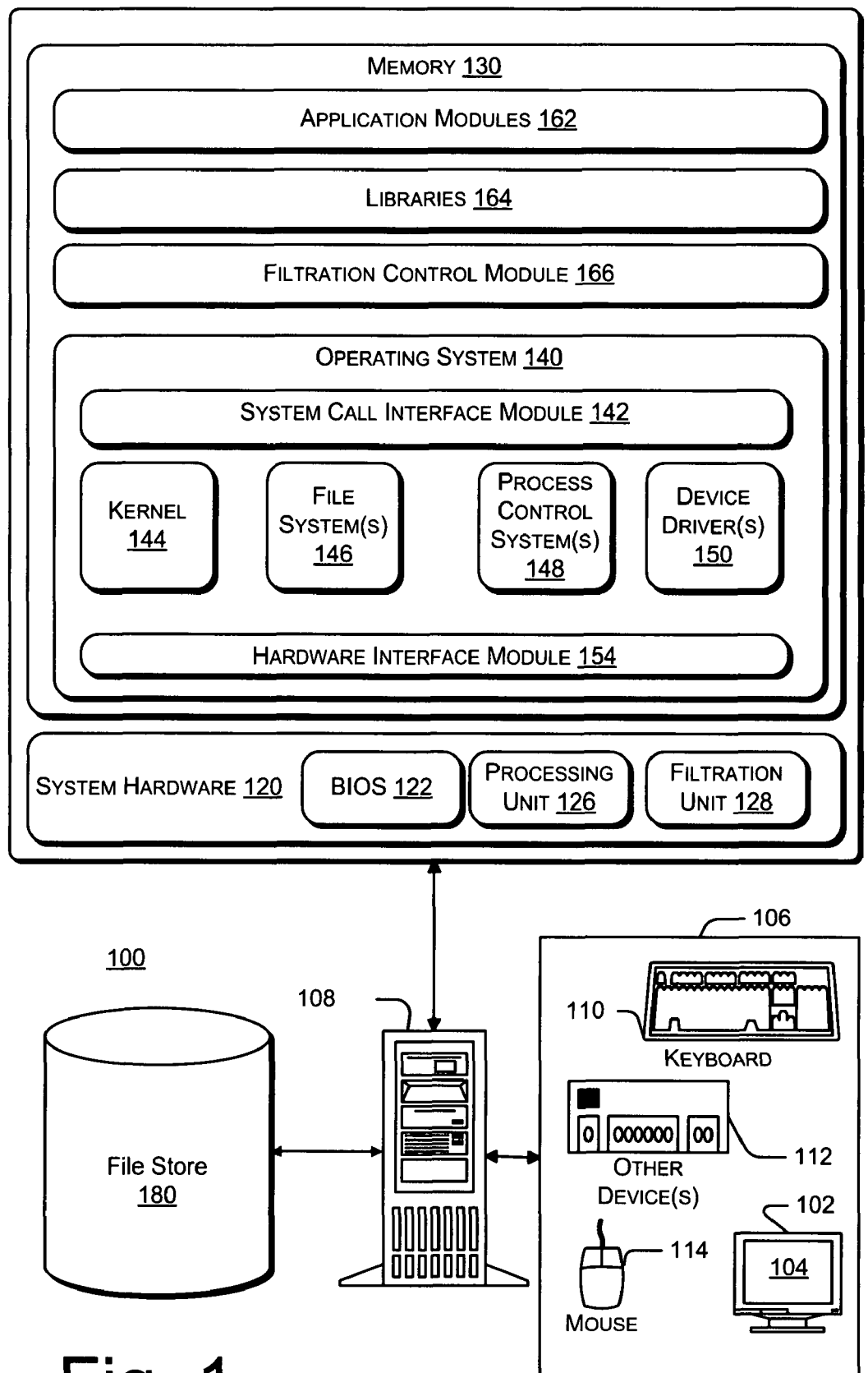
FIG. 1 is a schematic illustration of a computer system comprising an air filtration system, according to embodiments.

FIG. 1 is a schematic illustration of a computing system 100 adapted to include an air filtration system, according to some embodiments. In the illustrated embodiment, system 100 may be embodied as a hand-held or stationary device for accessing the Internet, a desktop PCs, notebook computer, personal digital assistant, or any other processing devices.

The computing system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 including a processing unit 126, a basic input/output system (BIOS) 122, and random access memory and/or read-only memory 130. A file store 180 is communicatively connected to computer 108. File store 180 may be internal such as, e.g., one or more hard drives, or external such as, e.g., one or more external hard drives, network attached storage, or a separate storage network.

Memory 130 includes an operating system 140 for managing operations of computer 108. In one embodiment, operating system 140 includes a hardware interface module 154 that provides an interface to system hardware 120. In addition, operating system 140 includes a kernel 144, one or more file systems 146 that manage files used in the operation of computer 108 and a process control subsystem 148 that manages processes executing on computer 108. Operating system 140 further includes one or more device drivers 150 and a system call interface module 142 that provides an interface between the operating system 140 and one or more application modules 168 and/or libraries 164. The various device drivers 150 interface with and generally control the hardware installed in the computing system 100.

In operation, one or more application modules 162 and/or libraries 164 executing on computer 108 make calls to the system call interface module 142 to execute one or more commands on the computer's processor. The system call interface module 142 invokes the services of the file systems 146 to manage the files required by the command(s) and the process control subsystem 148 to manage the process required by the command(s). The file system(s) 146 and the process control subsystem 148, in turn, invoke the services of the hardware interface module 154 to interface with the system hardware 120. The operating system kernel 144 can be generally considered as one or more software modules that are responsible for performing many operating system functions.

The particular embodiment of operating system 140 is not critical to the subject matter described herein. Operating system 140 may be embodied as a UNIX operating system or any derivative thereof (e.g., Linux, Solaris, etc.) or as a Windows® brand operating system.

In some embodiments, computer system 100 comprises a filtration unit 128 and a filtration control module 166, which may be embodied as logic instructions recorded in a computer readable medium. Additional details about the filtration unit and the filtration control module, 166 are discussed below with reference to FIGS. 2A, 2B and FIG. 3.

Figure 2A:
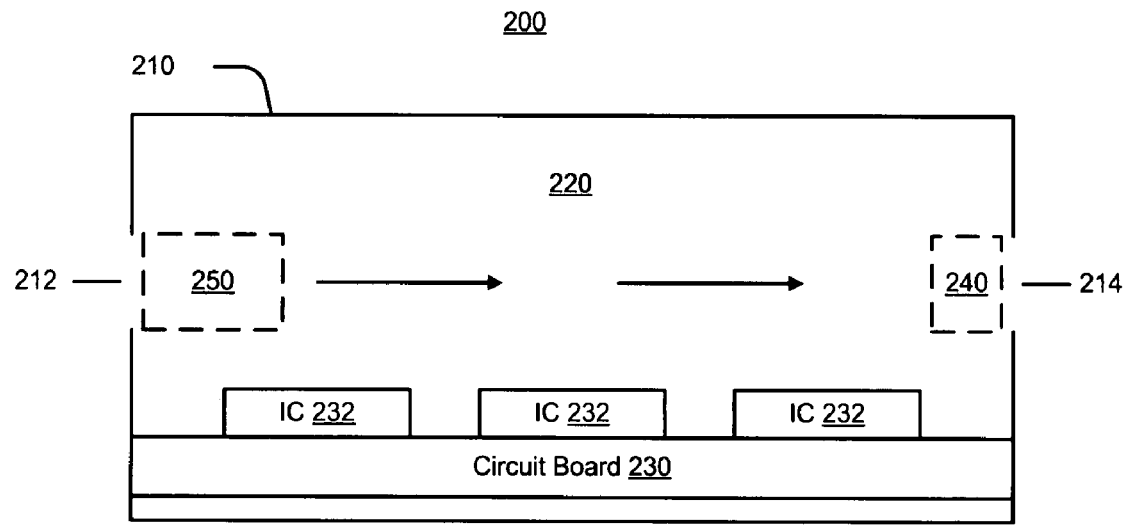
FIG. 2A is a schematic illustration of an electronic device comprising an air filtration system, according to embodiments.

FIG. 2A is a schematic illustration of an electronic device comprising an air filtration system, according to embodiments. Referring first to FIG. 2A, electronic device 200 comprises a housing 210 defining a chamber 220. Components of the computer system 200 reside within the chamber 220. Among other components, the computer system comprises a circuit board 230 positioned in the chamber 220. The circuit board 230 comprises at least one integrated circuit 232, and in practice typically comprises a plurality of integrated circuits 232. The housing includes an air inlet port 212 and one or more air outlet ports 214 formed in the housing.

The electronic device 200 includes a fluid flow generator to generate an air flow across the circuit board in the chamber. In the embodiment depicted in FIG. 2A, the fluid flow generator comprises a fan 240 positioned proximate the air outlet port 214 to generate a partial vacuum in the chamber 220, e.g., by blowing air out of chamber 220 into the surrounding environment. The partial vacuum in chamber 220 induces air flow into the chamber 220 from inlet port 212. In alternate embodiments, the fluid flow generator may comprise a fan positioned proximate the air inlet port to force air into the chamber 220. Further, in some embodiments, the fluid flow generator may comprise an electrokinetic fan.

Figure 2B:
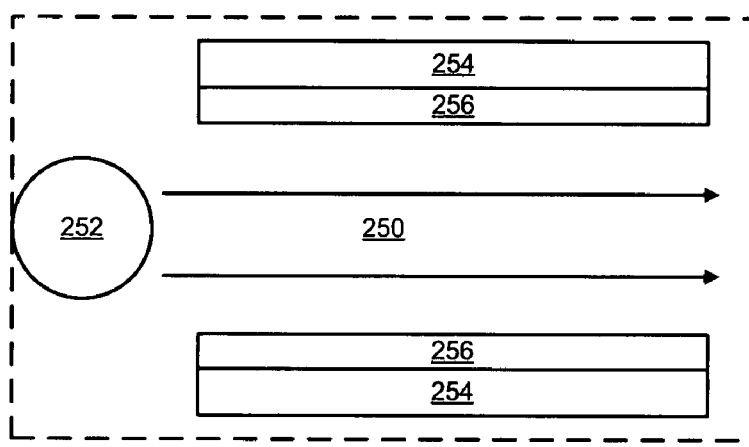
FIG. 2B is a schematic illustration of an air filtration system, according to embodiments.

Electronic device 200 further comprises an electrostatic air filtration system 250 to filter air entering the chamber from the air inlet port 212. FIG. 2B is a schematic illustration of an air filtration system, according to embodiments. In the embodiment depicted in FIG. 2B, the air filtration system 250 comprises one or more ionizers 252 to impart an electrostatic charge to particles flowing through the air filtration system 250 and capturing plates 254 to attract electrostatically charged particles. In general, ionizers 252 impart a charge of a first polarity to particles flowing through air filtration system 250 and capturing plates are charged to a second polarity, opposite the first polarity, in order to attract particles to capturing plates 254. For example, ionizers 252 may impart a negative charge to particles flowing though air filtration system 250, and capturing plates 254 may be positively charged. Thus, particles flowing through air filtration system 250 will be attracted to capturing plates 254. In alternate embodiments the ionizers 252 may impart a positive charge to particles flowing though air filtration system 250 and capturing plates 254 may be negatively charged. In some embodiments, capturing plates may comprise one or more filters 256 to capture particles attracted to capturing plates 254.

In some embodiments, the electrostatic air filtration system 250 may be removably coupled to the housing 210, such that the air filtration system 250 or it's capturing plates 254, 256 may be removed and cleaned, if desired.

In some embodiments, the electronic device 200 may be implemented as a computer system such as the computer system 100 depicted in FIG. 1. In such embodiments, the device may include logic to recognize a filtration system and to coordinate operations of the computer system and the air filtration system. For example, referring briefly to the embodiment depicted in FIG. 1, the basic input/output system (BIOS) 122 may include logic to detect the presence of an air filtration system 250 in the computer system, and to activate a filtration control module 166 in response to the presence of an air filtration system 250.

Figure 3:
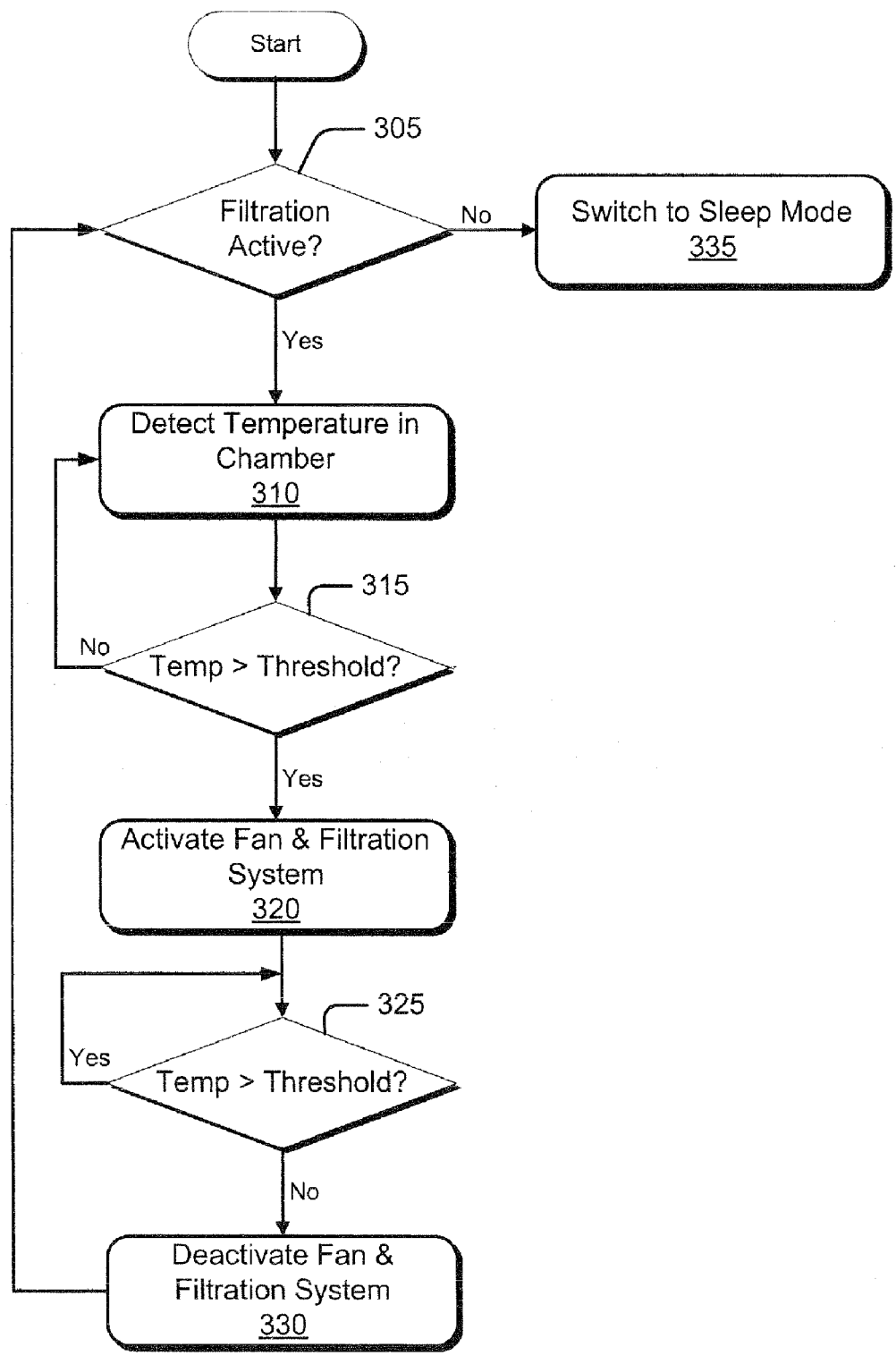
FIG. 3 is a flowchart illustrating operations in one embodiment of a filtration control module.

FIG. 3 is a flowchart illustrating operations in one embodiment of a filtration control module, such as the filtration control module 166 depicted in FIG. 1. Referring to FIG. 3, if, at operation 305, the filtration system is not active, then control passes to operation 335 and the computer system is switched into a sleep mode. By contrast, if at operation 305 the filtration system is active then at operation 310 the filtration control module 166 detects a temperature in the chamber 220. For example, the air filtration control module 166 may receive a signal indicative of a temperature reading in the chamber 220 from one of the integrated circuits 232 or from a thermocouple or other suitable temperature detection device in chamber 220. If, at operation 315, the temperature is less than or equal to a threshold, then the air filtration control module continues to monitor temperature in the chamber 220 (operation 310).

By contrast, if at operation 315 the temperature in the chamber 220 exceeds a threshold, then the air filtration control module 166 activates a fan 240 and the air filtration system 250 (operation 320). The system continues to monitor the temperature (operation 325), and the fan 240 and filtration system 250 may remain active as long as the temperature remains above the threshold. If the temperature falls below a threshold, then the fan and filtration system may be deactivated (operation 330).

In some embodiments the air filtration control module 166 may include logic that switches the computer system's operating mode in response to a change in status of the filtration system. For example, the air filtration control module 166 may monitor the operating status of the air filtration system 250. If the system remains active, then the computer system may continue normal operations. By contrast, if the air filtration system 250 becomes inactive, for example if the system is removed or otherwise inactivated, then the air filtration control module 166 may cause the computer system to enter a sleep mode. For example, the air filtration control module 166 may generate an interrupt, which may be passed to the BIOS, which in turn may place the computer system into a sleep mode.

Figure 4:
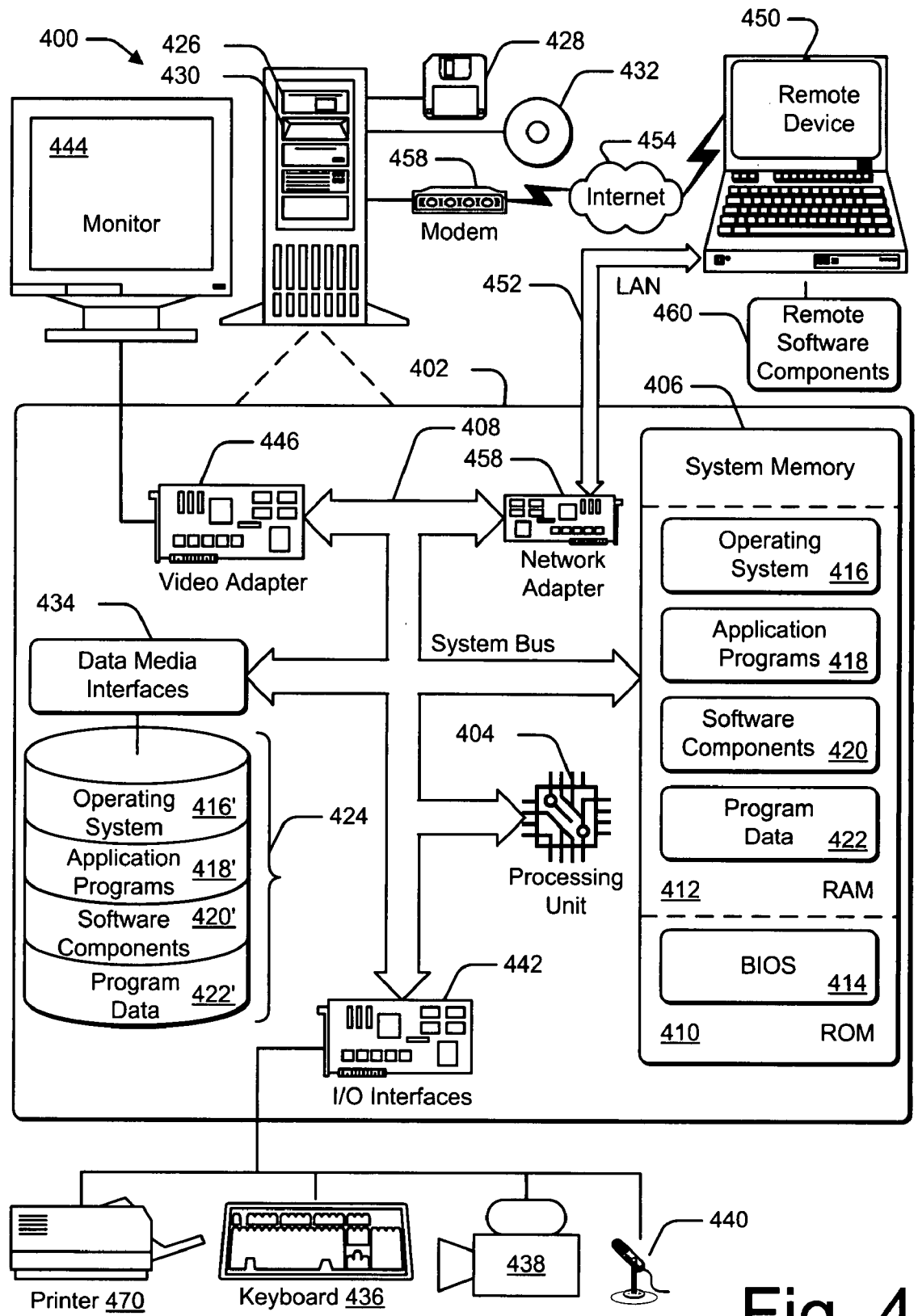
FIG. 4 is a schematic illustration of a computing environment, according to embodiments.

FIG. 4 is a schematic illustration of one embodiment of a computing environment. The components shown in FIG. 4 are only examples, and are not intended to suggest any limitation as to the scope of the functionality of the invention; the invention is not necessarily dependent on the features shown in FIG. 4.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 4, the components of computer 400 may include, but are not limited to, a processing unit 404, a system memory 406, and a system bus 408 that couples various system components including the system memory 406 to the processing unit 404. The system bus 408 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus, and PCI Express (PCIE).

Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 406 includes computer storage media in the form of volatile and/or nonvolatile memory such as read only memory (ROM) 410 and random access memory (RAM) 412. A basic input/output system 414 (BIOS), containing the basic routines that help to transfer information between elements within computer 400, such as during start-up, is typically stored in ROM 410. RAM 412 typically contains data and/or program modules that are immediately accessible to and/or presently being operated on by processing unit 404. By way of example, and not limitation, FIG. 4 illustrates operating system 416, application programs 418, other software components 420, and program data 422.

The computer 400 may also include other removable/non-removable, volatile/nonvolatile computer storage media. By way of example only, the computer system of FIG. 4 may include a hard disk drive 424 that reads from or writes to non-removable, nonvolatile magnetic media, a magnetic disk drive 426 that reads from or writes to a removable, nonvolatile magnetic disk 428, and an optical disk drive 430 that reads from or writes to a removable, nonvolatile optical disk 432 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 424 is typically connected to the system bus 408 through a non-removable memory interface such as data media interface 434, and magnetic disk drive 426 and optical disk drive 430 are typically connected to the system bus 408 by a removable memory interface.

The drives and their associated computer storage media discussed above and illustrated in FIG. 4 provide storage of computer-readable instructions, data structures, program modules, and other data for computer 400. In FIG. 4, for example, hard disk drive 424 is illustrated as storing operating system 416', application programs 418', software components 420', and program data 422'. Note that these components can either be the same as or different from operating system 416, application programs 418, software components 420, and program data 422. Operating system 416, application programs 418, other program modules 420, and program data 422 are given different numbers here to illustrate that, at a minimum, they are different copies. A user may enter commands and information into the computer 400 through input devices such as a keyboard 436 and pointing device 438, commonly referred to as a mouse, trackball, or touch pad. Other input devices (not shown) may include a microphone 440, joystick, game pad, satellite dish, scanner, or the like. These and other input devices are often connected to the processing unit 404 through an input/output (I/O) interface 442 that is coupled to the system bus, but may be connected by other interface and bus structures, such as a parallel port, game port, or a universal serial bus (USB). A monitor 444 or other type of display device is also connected to the system bus 406 via an interface, such as a video adapter 446. In addition to the monitor 444, computers may also include other peripheral output devices (e.g., speakers) and one or more printers 470, which may be connected through the I/O interface 442.

The computer may operate in a networked environment using logical connections to one or more remote computers, such as a remote computing device 450. The remote computing device 450 may be a personal computer, a server, a router, a network PC, a peer device or other common network node, and typically includes many or all of the elements described above relative to computer 400. The logical connections depicted in FIG. 4 include a local area network (LAN) 452 and a wide area network (WAN) 454. Although the WAN 454 shown in FIG. 4 is the Internet, the WAN 454 may also include other networks. Such networking environments are commonplace in offices, enterprise-wide computer networks, intranets, and the like.

When used in a LAN networking environment, the computer 400 is connected to the LAN 452 through a network interface or adapter 456. When used in a WAN networking environment, the computer 400 typically includes a modem 458 or other means for establishing communications over the Internet 454. The modem 458, which may be internal or external, may be connected to the system bus 406 via the I/O interface 442, or other appropriate mechanism. In a networked environment, program modules depicted relative to the computer 400, or portions thereof, may be stored in the remote computing device 450. By way of example, and not limitation, FIG. 4 illustrates remote application programs 460 as residing on remote computing device 450. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. An electronic device, comprising:
   a housing defining a chamber;
   a circuit board positioned in the chamber and comprising at least one integrated circuit;
   an air inlet port and one or more air outlet ports formed in the housing;
   a fluid flow generator to generate an air flow across the circuit board in the chamber;
   an electrostatic air filtration system to filter air entering the chamber from the air inlet port;
   a processor;
   logic instructions stored in a computer readable medium which, when executed by the processor, configure the processor to:
     detect a temperature in the chamber; and
     activate the fluid flow generator and the air filtration system in response to detecting the temperature exceeding a threshold.

2. The electronic device of claim 1, wherein the fluid flow generator comprises a fan positioned proximate the one or more air outlet ports to generate a partial vacuum in the chamber.

3. The electronic device of claim 1, wherein the fluid flow generator comprises a fan positioned proximate the air inlet port.

4. The electronic device of claim 1, wherein fluid flow generator comprises an electrokinetic fan.

5. The electronic device of claim 1, wherein the air filtration system comprises:
   at least one ionizer to impart an electrostatic charge to particles flowing through the air filtration system; and
   at least one capturing plate to attract electrostatically charged particles.

6. The electronic device of claim 1, where at least a portion of the air filtration system is removably coupled to the housing.

7. The electronic device of claim 1, further comprising logic instructions stored on the computer readable medium which, when executed, configure the processor to:
   detect a deactivation of the air filtration system; and
   switch an operating status of the electronic device into a sleep mode in response to the deactivation of the air filtration system.

8. The electronic device of claim 1, further comprising:
   a basic input/output system; and
   logic in the basic input/output system to:
     detect presence of the air filtration system; and
     activate a filtration control module in response to the presence of the air filtration system, wherein the filtration control module is configured to control operation of the air filtration system.

9. The electronic device of claim 1, wherein the fluid flow generator and electrostatic air filtration system are inside the chamber defined by the housing.

10. The electronic device of claim 1, wherein the temperature is provided by a temperature reading from the circuit board.

11. A method, comprising:
    initiating power on self test processing in a basic input/output system of an electronic device;
    detecting presence of an electrostatic air filtration system;
    activating a filtration control module in response to the presence of the air filtration system; and
    activating and deactivating the air filtration system in response to comparing a temperature inside the electronic device to a threshold, wherein the air filtration system is activated in response to determining that the temperature is above the threshold, and wherein the air filtration system is deactivated in response to determining that the temperature is below the threshold.

12. The method of claim 11, wherein the filtration control module is configured to:
    activate a fluid flow generator and the air filtration system in response to determining that the temperature exceeds the threshold.

13. The method of claim 11, further comprising:
    in response to detecting deactivation of the air filtration system, switching an operating status of the electronic device into a sleep mode.

14. A computer system, comprising:
    a housing defining a chamber;
    an air inlet port and one or more air outlet ports formed in the housing;
    an electrostatic air filtration system to filter air entering the chamber from the air inlet port;
    a processor; and
    logic instructions stored on a computer readable medium which, when executed, configure the processor to:
      detect deactivation of the air filtration system; and
      switch an operating status of the computer system into a sleep mode in response to the deactivation of the air filtration system.

15. The computer system of claim 14, further comprising a fan positioned proximate the one or more air outlet ports to generate a partial vacuum in the chamber.

16. The computer system of claim 15, wherein the fan comprises an electrokinetic fan.

17. The computer system of claim 14, wherein the air filtration system comprises:
    at least one ionizer to impart an electrostatic charge to particles flowing through the air filtration system; and
    at least one capturing plate to attract charged electrostatically charged particles.

18. The computer system of claim 14, where at least a portion of the electrostatic air filtration system is removably coupled to the housing.

19. The computer system of claim 14, further comprising:
    logic instructions stored on the computer readable medium which, when executed by the processor, configure the processor to:
      detect a temperature in the chamber; and
      activate a fluid flow generator and the air filtration system in response to detecting the temperature exceeding a threshold.

20. The computer system of claim 14, further comprising an airflow generator and a circuit board, wherein the airflow generator, the air filtration system, and the circuit board are in the chamber, and wherein the airflow generator is to generate an airflow to cool the circuit board.

* * * * *